H. R. HOGSETT.
LISTER ATTACHMENT.
APPLICATION FILED NOV. 17, 1917.
1,283,517.
Patented Nov. 5, 1918.
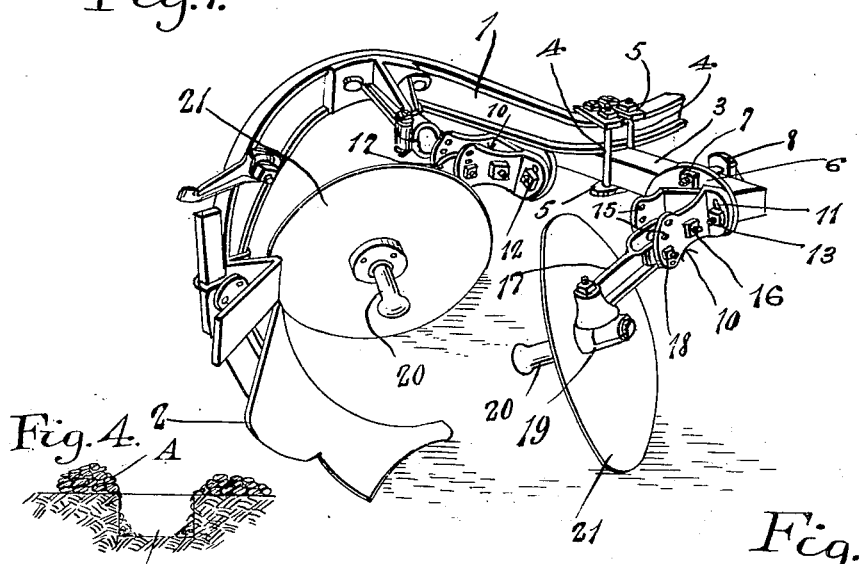
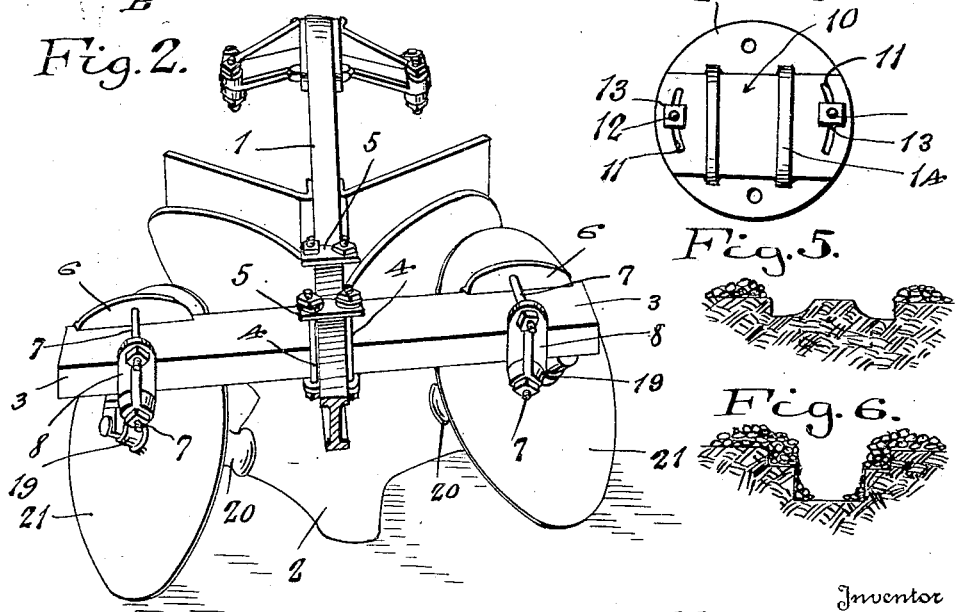
Inventor
H. R. Hogsett.

UNITED STATES PATENT OFFICE.

HIRAM R. HOGSETT, OF SHENANDOAH, IOWA.

LISTER ATTACHMENT.

1,283,517.	Specification of Letters Patent.	Patented Nov. 5, 1918.

Application filed November 17, 1917. Serial No. 202,615.

*To all whom it may concern:*

Be it known that I, HIRAM R. HOGSETT, a citizen of the United States, residing at Shenandoah, in the county of Page and State of Iowa, have invented certain new and useful Improvements in Lister Attachments; and I do hereby declare the following to be a full, clear, and exact description of the invention, such as will enable others skilled in the art to which it appertains to make and use the same.

This invention relates to a disk attachment, and the primary object of the invention is to provide a disk attachment comprising a pair of ordinary metallic disks which are positioned in front of and in spaced relation laterally to the ordinary furrow opening plow of a lister for dressing a furrow, or for removing the surface dirt away from the furrow which is formed by the lister plow.

More specifically, the object of the invention is to provide a surface dirt removing and furrow dressing disk attachment for listers, which comprises a bar that is adjustably connected to the beam of the lister and has a pair of clevises adjustably connected thereto for lateral movement independently of each other, and for pivotal movement, to which clevises are adjustably connected arms which support the spindles upon which the disks are mounted, so that the position of the disks with respect to each other and the lister share or plow may be adjusted as desired and also so that the angle of the disks with respect to the perpendicular may be adjusted as desired for regulating the throw of the dirt.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a fragmentary perspective view of a lister, showing the invention applied and looking from the rear side of the device.

Fig. 2 is a perspective view of a fragment of the lister showing the invention applied and looking from the front, and Fig. 3 is a detail view of a part of the construction of the improved attachment.

Fig. 4 is a sectional view through a furrow formed by an ordinary lister.

Fig. 5 is a sectional view through the ground illustrating the two side furrows formed by the disk attachment prior to formation of the furrow by the lister plow and illustrating how the dirt is piled upon the sides of the furrows, and Fig. 6 is a sectional view through a furrow formed by a lister having the improved side dressing disks attached thereto.

Referring more particularly to the drawings, 1 designates the lister beam, which is the ordinary construction, and 2 indicates the lister plow or furrow opening shovel. It is to be understood that while a particular type of lister is illustrated in the drawings, that the invention may be applied to any ordinary type of lister now upon the market without departing from the spirit of this invention.

The improved attachment is attached to the beam 1 of the lister, forwardly of the plow 2 through the medium of a bar 3 which extends transversely to the beam 1, and is connected to the beam by a plurality of bolts 4 and plates 5. The bolts 4 extend along each edge of the bar 3 and beam 1, and securely clamp the plates 5 in engagement with the upper and lower surfaces of the beam and cross bar respectively, so as to permit of adjustable connection between the beam and the bar 3.

The bar 3 has substantially circular plates 6 attached thereto near its ends, which plates are clamped upon the rear edge of the cross bar near each end of the same by means of bolts 7, which extend through the upper and lower portions of the plates and through plates 8 which are positioned on the front edge of the cross bar 3. The bolts 7 securely clamp the plates 6 and 8 in engagement with the respective edges of the cross bar 3, and by loosening the nuts upon the bolts, the lateral position of these plates with respect to each other and with respect to the beam 1 may be varied as desired.

Substantially U-shaped plates 10 are attached to the plates 6, and the plates 10 are provided with arcuate slots 11 formed therein through which bolts 12 extend. Nuts 13 are mounted upon the bolts 12 for clamping the plates 10 in firm connection with the plates 6 at adjusted positions. The outwardly extending arms 14 which are formed upon the plates 10 are provided with a plurality of openings 15 arranged in spaced relation to each other in an arc about the bolts 16 as a center. Arms 17 are adjustably connected to the arms 14 by the bolts 16 and they are held in various pivoted positions by means of bolts 18 which extend through any one of the alining pairs of openings 15. The arms 17 support bearings 19 on their rear ends, which bearings in turn support the spindles 20 upon which the disks 21 are mounted. The disks 21 are positioned forwardly of and laterally of the plow 2 for dressing the ground upon each side of the furrow to be formed by the lister, for removing the surface dirt, so as to prevent the furrow from falling upon the corn and covering the same too deep, after it has been planted.

The provision of the various adjustments heretofore described permit the disks 21 to be positioned at any desired distance apart or away from the plow 2, and these adjustments also permit one disk to be placed closer to the plow if desired, and may further permit of the angling of the disks with respect to the perpendicular and also with respect to the direction of travel of the lister so that the disks may be adjusted to perform their functions in the most efficient manner.

Fig. 4 of the drawing shows a furrow formed by an ordinary lister and it will be noted that the dirt indicated by the letter "A" which is thrown out of the furrow "B" is simply piled upon the hard packed ground on each side of the furrow leaving the ground upon each side of the furrow unpulverized as in a compact case. It has been found that this ground very soon, before the corn can be cultivated, sprouts and grows weeds which have such a start, of the corn, that in many cases it is impossible to dislodge and destroy them by cultivation and furthermore the weeds sap the strength from the corn before the latter is large enough to be cultivated. Figs. 5 and 6 show how the furrows are formed by the use of the attachment and it will be noticed that the attachment removes the dirt from each side of the furrow wall making two small furrows along each side of the furrow to be formed by the plow of the lister so that the lister deposits the dirt in these furrows and builds up a furrow wall of pulverized dirt as shown clearly in Fig. 6 of the drawing, loosening the soil along each side of the furrow and preventing weeds from getting a start on the corn.

In reducing the invention to practice, certain minor features of construction, combination and arrangement of parts may necessitate alterations to which the patentee is entitled provided such alterations are comprehended within the scope of what is claimed.

What is claimed is:—

1. The combination with an ordinary lister embodying a plow and a plow beam, of a cross bar adjustably connected to said beam, a pair of furrow dressing members adjustably carried by said cross bar for lateral adjustment upon the bar, and for pivotal adjustment with respect to the vertical and horizontal, said members being positioned forwardly and on each side of said plow.

2. The combination with an ordinary lister including a plow and a plow beam, a cross bar adjustably connected to said beam forwardly of the plow, a pair of furrow dressing disks adjustably carried by said cross bar for lateral adjustment upon the bar, and for pivotal adjustment with respect to the vertical and horizontal.

3. The combination with an ordinary lister including a plow, of a pair of furrow dressing members supported forwardly and laterally of the plow, said members mounted for lateral adjustment and for pivotal movement with respect to the vertical and horizontal.

4. The combination of an ordinary lister embodying a plow and a plow beam, of a cross bar adjustably connected to said beam, a pair of furrow dressing members adjustably carried by said cross bar for lateral adjustment upon the bar, and for pivotal adjustment with respect to the vertical and horizontal, said members being positioned forwardly and laterally of said plow, and means for holding said members against accidental movement in adjusted pivotal positions.

In testimony whereof I affix my signature in presence of two witnesses.

HIRAM R. HOGSETT.

Witnesses:
 FREDERICK FISCHER,
 WILLIAM S. KNIGHT.